No. 791,403. PATENTED MAY 30, 1905.
G. M. BREWER.
WEIGHING AND COMPUTING SCALE.
APPLICATION FILED MAR. 28, 1904.
2 SHEETS—SHEET 2.
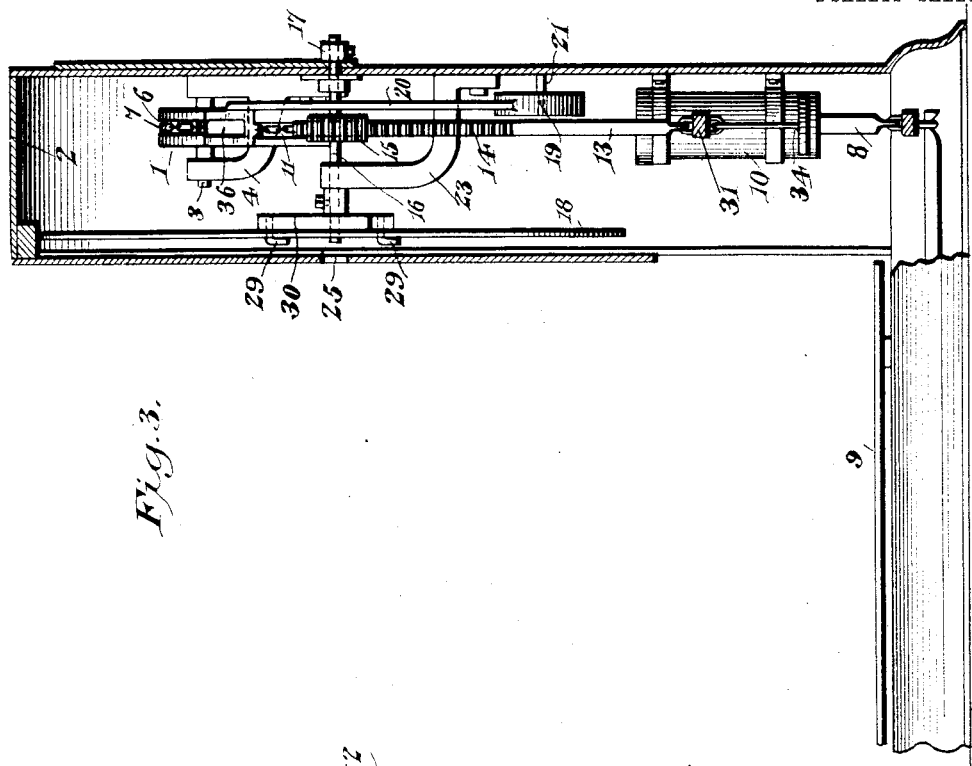
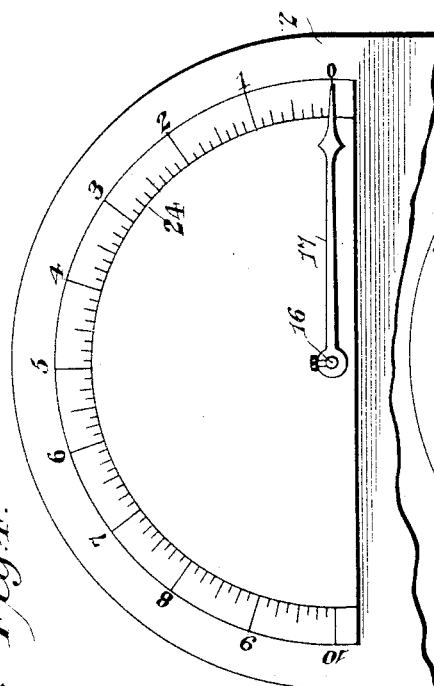
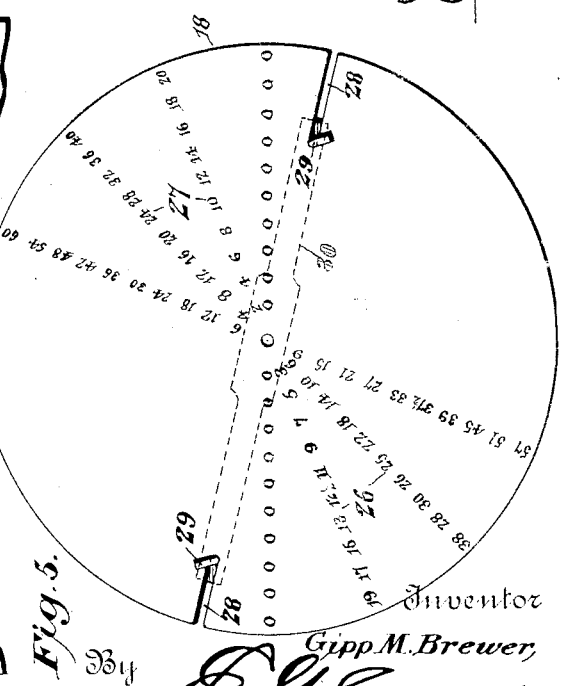
Witnesses
Jas. F. McCathran
N. F. Riley
Inventor
Gipp M. Brewer,
By
C. G. Siggers
Attorney No. 791,403.

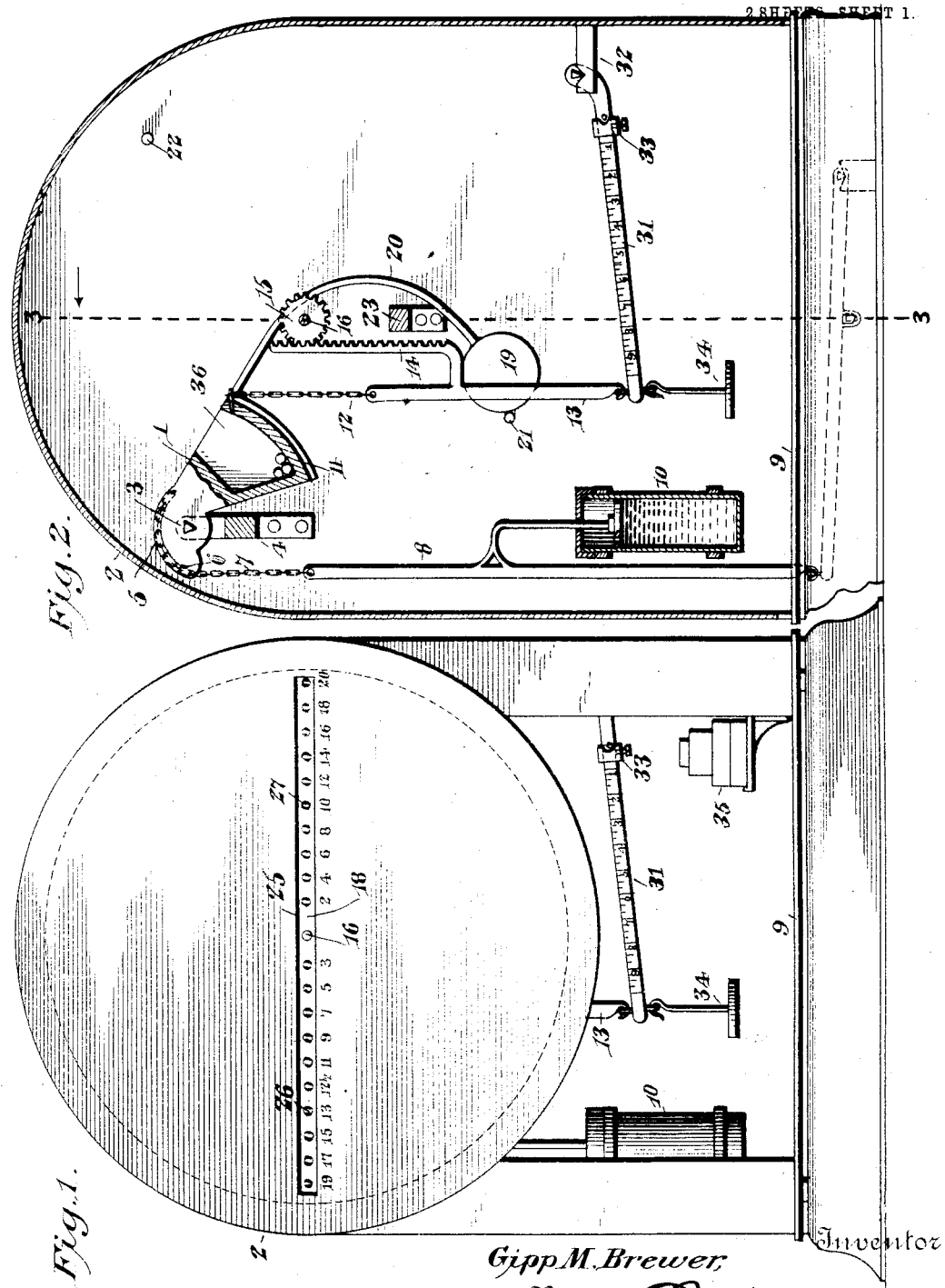

Patented May 30, 1905.

UNITED STATES PATENT OFFICE.

GIPP M. BREWER, OF SYLVIA, KANSAS, ASSIGNOR OF ONE-THIRD TO JOHNSON A. BLACK, OF SYLVIA, KANSAS.

WEIGHING AND COMPUTING SCALE.

SPECIFICATION forming part of Letters Patent No. 791,403, dated May 30, 1905.

Application filed March 28, 1904. Serial No. 200,383.

*To all whom it may concern:*

Be it known that I, GIPP M. BREWER, a citizen of the United States, residing at Sylvia, in the county of Reno and State of Kansas, have invented a new and useful Weighing and Computing Scale, of which the following is a specification.

The invention relates to improvements in weighing and computing scales.

The object of the present invention is to improve the construction of weighing and computing scales and to provide a simple and comparatively inexpensive one of great strength and durability adapted to indicate accurately both the price and the weight and capable of enabling the tare to be counterbalanced.

A further object of the invention is to provide a scale designed especially for use on counters and adapted to indicate the weight of the goods to the purchaser and their price to the salesman.

The invention also has for its object to provide a construction adapted for use on scales of various styles and sizes and capable of being readily connected with an ordinary scale-platform and of being substituted for the ordinary scale-beam.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is an elevation of a weighing and computing scale constructed in accordance with this invention. Fig. 2 is a vertical sectional view of the same. Fig. 3 is a vertical sectional view on the line 3 3 of Fig. 2. Fig. 4 is a detail view of a portion of the casing, illustrating the arrangement of the weight-graduations and the weight-indicating hand or pointer. Fig. 5 is a detail view of the calculator-dial.

Like numerals of reference designate corresponding parts in all the figures of the drawings.

1 designates a beam arranged within a suitable casing 2 and provided with a knife-edge pivot 3, arranged in suitable bearings of a bracket or support 4, which is suitably fixed to one of the walls of the casing, as clearly shown in Figs. 2 and 3 of the drawings. The pivot is located near one end of the beam, and the latter is provided at such end with an eccentrically-arranged edge 5, curved, as shown, the distance between the eccentrically-arranged edge and the fulcrum or pivot of the beam, gradually decreasing from the outer to the inner end of the said edge, whereby the effective portion of the short arm of the beam is gradually shortened as the long arm swings upward.

The short arm of the beam is provided with a groove 6 to receive a chain 7 or other flexible connection, which is attached to the upper end of a rod 8, that extends downward to the platform-levers. The platform 9 of the scale may be supported by any arrangement of platform-levers, and the rod or bar 8 may be connected with any other form of receptacle for the goods to be weighed, whereby the weight of the goods will be transmitted to the short arm of the beam. The rod or bar 8 is provided between its ends with an angularly-disposed arm or extension, which is connected with a dash-pot 10, consisting of a plunger and a cylinder filled with oil or other suitable liquid. The plunger-head is provided with suitable openings to permit the liquid to pass through it, and the dash-pot is adapted to relieve the scale of sudden jars incident to placing the goods to be weighed on the platform and removing them therefrom quickly.

The long arm of the beam 1 has a curved edge 11, which is provided with a groove to receive a chain 12 or other suitable flexible connection, which is attached at its lower end to a rod or bar 13, and the latter carries a vertically-disposed rack-bar 14, which meshes with a pinion 15 of a horizontal shaft 16. The shaft carries a weight-indicating hand or pointer 17 at one end and is provided at the other end with a calculator-dial 18. The scale illustrated in the accompanying drawings is designed for computing the price of goods up to ten pounds, and the beam is provided at its long arm with a weight 19, connected with the long arm of the beam by means of a curved rod 20, arranged to clear the gearing, as illustrated in Fig. 2 of the drawings. The weight 19 and the eccentrically-arranged edge of the short arm of the beam are of a size and character to indicate weight and to make calculations up to ten pounds; but, as will be readily understood, the parts may be varied for enabling the scales to weigh any other desired number of pounds and to make any other desired calculations.

The beam 1 is adapted to make one-fourth of a revolution, and the gearing causes the shaft to rotate twice as rapidly as the beam, whereby the hand or pointer 17 and the calculator-dial will make one-half a revolution when the beam 1 swings through one-fourth of a revolution. The casing is provided with suitable stops 21 and 22 for limiting the movement of the beam 1. The shaft 16 is journaled in suitable bearings of the casing, and it is preferably supported by an arm or bracket 23, as illustrated in Fig. 3 of the drawings.

The outer or rear wall of the casing is provided with semicircular weight-graduations 24, over which the hand or pointer 17 is adapted to move for indicating the weight of the goods to the purchaser. The hand or pointer is secured to the shaft by means of a set-screw or any other suitable means.

The front of the casing is provided with a horizontal sight aperture or slot 25, extending in opposite directions from the center of the casing and adapted to expose diametrically opposite portions of the calculator-dial. In order to enable the calculations of the dial to be read with great accuracy and ease, the calculations 26, based on an odd price per pound, are arranged at one-half of the dial and extend downward around the same from the left-hand side, as clearly indicated in Fig. 5 of the drawings, and the calculations 27, based on an even price per pound, are located at the upper half of the dial and extend upward around the same from the right-hand side. By this arrangement the calculations may be conveniently read. The calculator-dial is provided with diametrically opposite slots 28 and is engaged by pivoted fastening devices 29 of arms 30, formed by a bar or cross-head secured to the shaft. The pivoted fastening devices, which are provided with outer engaging portions, are adapted to be turned longitudinally of the slots to permit the calculator-dial to be placed on and removed from the arms of the shaft. The dial may, however, be secured to the shaft in any other desired manner. By detachably securing the dial to the shaft the character of the calculations may be changed.

The lower end of the rod or bar 13 is provided with a hook and is connected with one end of a tare-beam 31, which is fulcrumed at its other end on a suitable support 32, the tare-beam being provided at its outer end with a knife-edge pivot, as clearly shown in Fig. 2. The tare-beam is graduated, as shown, and is provided with a sliding poise 33, which is adapted to balance the weight of a dish or other receptacle. The tare-beam is also provided at its inner end with a weight-hanger 34, which is adapted to receive additional poises or weights 35 of the usual construction for the double purpose of counterbalancing a heavy dish or receptacle and also for enabling the scale to weigh in excess of ten pounds. If ten pounds of goods be placed on the platform of the scale, the latter will indicate such weight, and it may then be brought to zero-point by placing a ten-pound weight on the hanger 34. The goods may then be weighed by the scale up to twenty pounds. By placing the various weights on the hanger 34 goods weighing in excess of ten pounds may be accurately weighed, as will be readily understood.

The front wall of the casing is provided adjacent to the slots with price-per-pound numerals, and these may be varied to adapt the scale to the character of the business in which it is used. The front of the casing is preferably circular, as shown, and open at the lower portion to expose the tare-beam and the weight-hanger.

The beam 1 is hollow, as indicated in Fig. 2, and the recess or cavity 36 is designed to receive small weights, such as shot, whereby any inaccuracy of the scale may be corrected.

Having thus fully described my invention, what I claim as new, and desire to secure by Letters Patent, is—

1. In a scale, the combination of a beam fulcrumed between its ends and provided at opposite sides of the fulcrum-point with curved edges, flexible connections attached to the beam and arranged to lie against the curved edges thereof, means connected with one of the flexible connections for receiving the goods to be weighed, indicating mechanism connected with the other flexible connection, and a tare-beam also connected with the latter, substantially as described.

2. A scale, comprising a beam having one arm weighted and provided at its other arm with an eccentrically-arranged edge adapted to vary the effective length of that arm of the beam when the latter is oscillated, a flexible connection arranged on the said edge and attached to the beam, means connected with the flexible connection for receiving the goods to be weighed, indicating mechanism connected with the weighted arm of the beam and operated by the same, and a tare-beam also connected with the weighted arm of the beam, substantially as described.

3. A scale, comprising a beam provided at its arms with curved edges, one of the edges being arranged eccentrically to vary the effective length of that arm when the beam is oscillated, flexible connections attached to the beam and arranged on the curved edges thereof, means connected with one of the flexible connections for receiving the goods to be weighed, indicating mechanism connected with the other flexible connection, and a tare-beam also connected with the latter, substantially as described.

4. A scale, comprising a beam having opposite curved edges, flexible connections attached to the beam and arranged on the curved edges thereof, means connected with one of the flexible connections for receiving the goods to be weighed, indicating mechanism connected with and operated by the other flexible connection, a tare-beam also connected with the latter, and a weight-receiving hanger connected with the same, substantially as described.

5. A scale, comprising a beam, means connected with one of the arms of the beam for receiving the goods to be weighed, indicating mechanism provided with gearing, connections between the other arm of the beam and the gearing, and a tare-beam connected with the said connections, substantially as described.

6. A scale, comprising a beam provided with opposite curved edges, one of the curved edges being eccentrically arranged, flexible connections arranged on the curved edges, means connected with one of the flexible connections for receiving the goods to be weighed, indicating mechanism having gearing connected with the other flexible connection, and a tare-beam connected with the latter, substantially as described.

7. A scale, comprising a beam, means connected with one of the arms of the beam for receiving the goods to be weighed, indicating mechanism, gearing having one of its members connected with the other arm of the beam and another member connected with the indicating mechanism, and a tare-beam connected with the gearing, substantially as described.

8. A scale, comprising a beam, means connected with one of the arms of the beam for receiving the goods to be weighed, a rod connected with the other arm of the beam, and provided with a rack-bar, a tare-beam connected with the rod and provided with a movable poise and having a weight-hanger, a gear meshing with the rack-bar, and indicating mechanism operated by the gear, substantially as described.

9. A scale, comprising a beam, indicating mechanism connected therewith, means connected with one of the arms of the beam for receiving the goods to be weighed, and a tare-beam connected with the other arm of the said beam and having a movable poise and provided with a weight-hanger, substantially as described.

In testimony that I claim the foregoing as my own I have hereto affixed my signature in the presence of two witnesses.

GIPP M. BREWER.

Witnesses:
G. W. MARDIS,
O. CUSSAR.